United States Patent [19]

Einchcombe et al.

[11] 4,082,167
[45] Apr. 4, 1978

[54] SLIDING CALIPER-TYPE DISC BRAKE AND SUPPORT STRUCTURE THEREFORE

[75] Inventors: Kenneth C. G. Einchcombe, Wickford; Kazimierz F. Kornat, Chelmsford, both of England

[73] Assignee: Ford Motor Company, Dearborn, Mich.

[21] Appl. No.: 806,977

[22] Filed: Jun. 16, 1977

Related U.S. Application Data

[63] Continuation of Ser. No. 685,023, May 10, 1976, abandoned.

[51] Int. Cl.² ............................................. F16D 65/02
[52] U.S. Cl. ................................... 188/73.6; 188/73.3
[58] Field of Search .................... 188/71.1, 72.4, 73.3, 188/73.5, 73.6

[56] References Cited

U.S. PATENT DOCUMENTS

| | | | |
|---|---|---|---|
| 3,081,843 | 3/1963 | Dotto et al. | 188/73.6 |
| 3,416,634 | 12/1968 | Swift | 188/73.3 |
| 3,917,033 | 11/1975 | Rath et al. | 188/73.3 |
| 3,930,564 | 1/1976 | Kobayashi et al. | 188/73.3 |
| 4,019,610 | 4/1977 | Hirai | 188/73.6 |

*Primary Examiner*—Trygve M. Blix
*Assistant Examiner*—Edward R. Kazenske
*Attorney, Agent, or Firm*—Clifford L. Sadler; Keith L. Zerschling

[57] ABSTRACT

A floating caliper disc brake for a motor vehicle according to this disclosure comprises an anchor plate, a pair of brake pads mounted on the anchor plate and a caliper slidably mounted on the anchor plate by means of a pair of bolts or pins. The brake is constructed such that removal of one of the blots or pins enables the caliper to be pivoted on the other bolt or pin to a position in which it is clear of the brake pads to permit access to the brake pads and enable their replacement.

1 Claim, 7 Drawing Figures

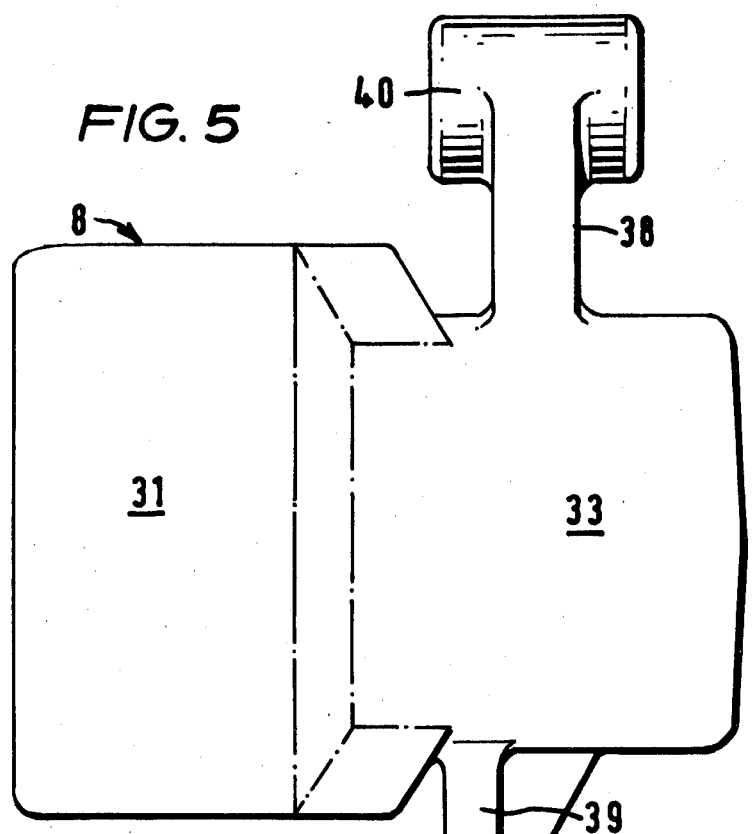
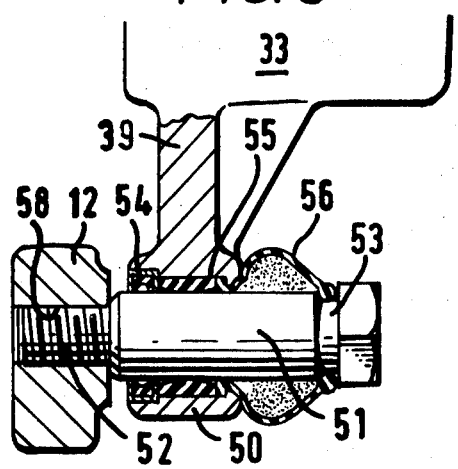
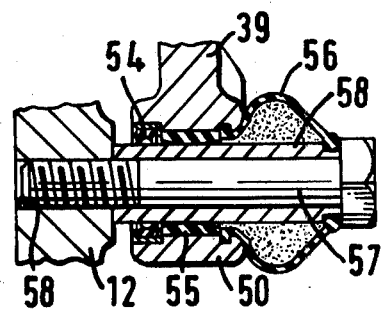

SLIDING CALIPER-TYPE DISC BRAKE AND SUPPORT STRUCTURE THEREFORE

This is a continuation of application Ser. No. 685,023, filed May 10, 1976 now abandoned.

BACKGROUND OF THE DISCLOSURE

This invention relates to motor vehicle disc brakes and is particularly concerned with disc brakes of the floating or sliding caliper type.

In so-called floating caliper disc brakes, the caliper is usually mounted on the yoke or anchor plate in such a manner that it can slide in a direction parallel to the axis of the brake rotor which it straddles. In a known brake, the caliper is provided with a pin at each end which pins pass through corresponding holes in the yoke or anchor plate and thereby serve to secure the caliper to the anchor plate. The pins are located outside the periphery of the brake rotor and, since the caliper must be located within the dished portion of the road wheel of a vehicle fitted with these disc brakes, the pins thereby restrict the diameter of the brake rotor. This means that the size of the brake pads is also restricted to a certain degree.

One of the objects of the present invention is to provide a floating caliper disc brake which avoids having to use a relatively small diameter brake rotor.

Another object of the present invention is to provide a disc brake in which the caliper need be only partially disassembled from the anchor plate to permit the ready removal and replacement of the brake pads.

BRIEF SUMMARY OF THE DISCLOSURE

According to a preferred embodiment of the invention, there is provided a floating caliper disc brake comprising a yoke or anchor plate, a caliper and a pair of brake pads, wherein the yoke or anchor plate is provided with a pair of guide pins projecting from the anchor plate in a direction intended to face away from a brake rotor. The caliper has a pair of guide bores for fitting over the guide pins whereby the caliper can be slidably mounted on the anchor plate.

By means of the arrangement according to the invention the pins may be located within the radial dimensions of the brake rotor and the part of the caliper straddling the rotor can be made relatively thin whereby, for a given size of dished wheel, a larger brake rotor can be used than on existing designs of disc brakes.

Further, since the caliper is secured to the anchor plate on the same side of the brake rotor as the anchor plate, a more rigid and robust construction is achieved through the use of shorter pins than was possible in existing designs.

The caliper is axially slidable on the guide pins and means are desirably provided for limiting the extent of such axial displacement. The limiting means may comprise a groove provided in at least one of the pins intermediate its ends and a member projecting from the caliper and engaging in said groove.

One of the guide pins may be provided with a sleeve over which the caliper is fitted. In this case, the axial sliding limiting means desirably comprise a groove provided in said sleeve intermediate its ends and a member projecting from the caliper and engaging in said groove.

The brake pads are supported on the anchor plate and not the caliper. The support for the caliper on the anchor is constructed so that by removing one of the guide pins, the caliper may be pivoted about the other pin to expose the brake pads. With the caliper in the pivoted position the brake pads may be removed and replaced by new pads without disassembling the caliper.

BRIEF SUMMARY OF THE DRAWINGS

The invention will now be further described, by way of example, with reference to the accompanying drawings, in which:

FIG. 5 is a plan view of the caliper shown in FIG. 1 taken in the direction of the arrow V;

FIG. 6 is a sectional view taken on the line VI—VI in FIG. 1 in the direction of the arrows; and FIG. 7 is a sectional view, similar to FIG. 6, of a modified form of fixing bolt for the caliper.

DETAILED DESCRIPTION OF THE DISCLOSURE

Figure 3:
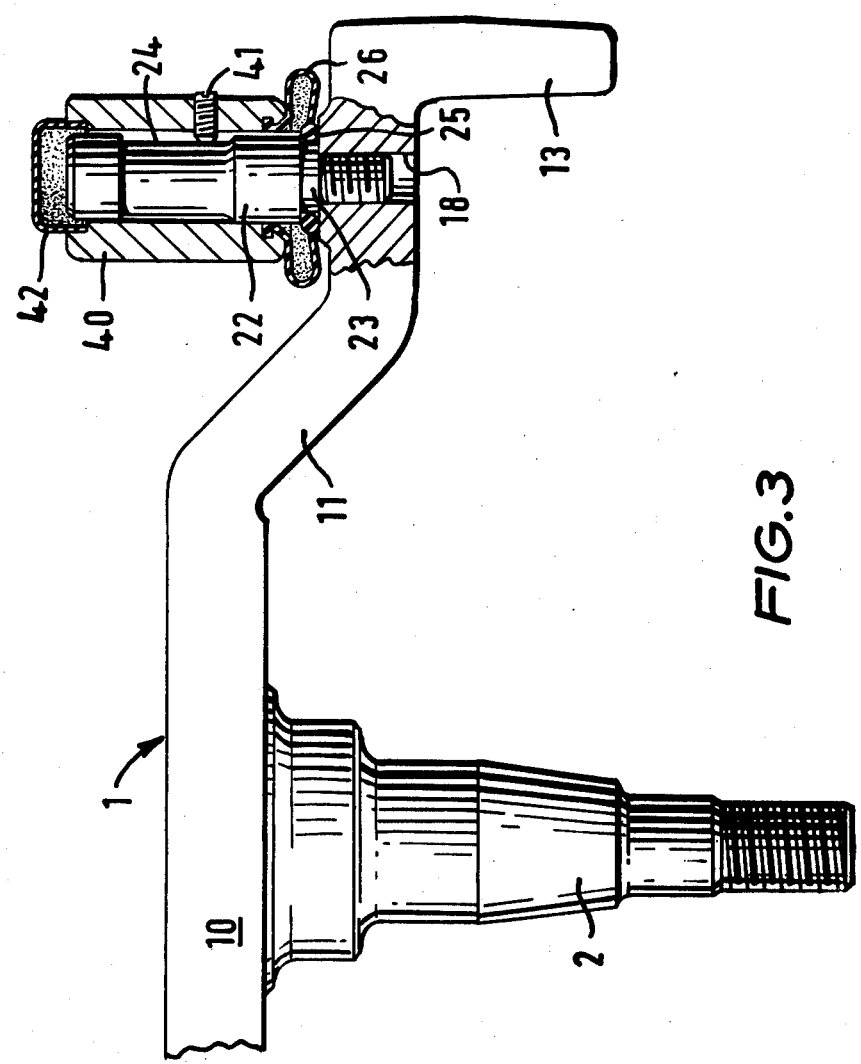
FIG. 3 is a plan view of the yoke or anchor plate of the disc brake shown in FIG. 1 taken in the direction of the arrow III.

Referring to the drawings, the disc brake comprises a yoke or anchor plate 1 which is secured to a wheel spindle 2 (FIG. 3). The anchor plate 1 may be formed integrally with the spindle 2 or connected to it by forging. Mounted on the wheel spindle 2 by means of bearings (not shown) is a wheel hub 3 on which a brake rotor 4 is integrally formed. A dished vehicle wheel 5 is secured to the hub 3 by means of conventional wheel bolts 6 and wheel nuts 7. A caliper 8 straddles the brake rotor 4.

Figure 1:
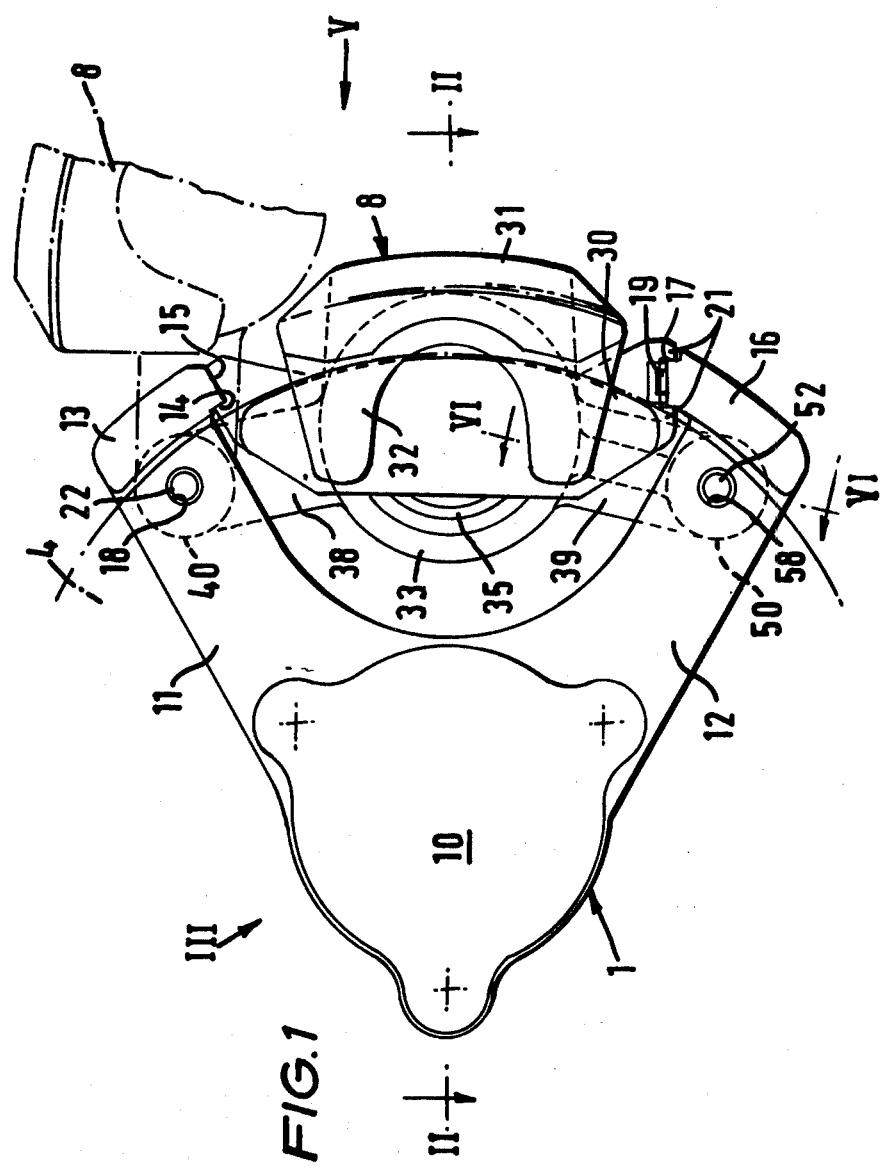
FIG. 1 is a side elevational view of one embodiment of a disc brake according to the invention.

The yoke 1 consists of a central section 10 and a pair of arms 11 and 12 which terminate in braking load receiving guide portions 13 and 16, respectively, for brake lining and shoe assemblies (brake pads) 20 and 30. The guide portions 13 and 16 extend across the periphery of the rotor 4. As shown in FIG. 1, the guide portion 13 is provided with a pair of guide surfaces 14 and 15 which support and guide one end of each of the brake pads 20 and 30. The guide portion 16 of anchor plate 1 is provided with a guide support 17 for the other end of each of the brake pads 20 and 30. The other ends of the pads 20 and 30 have ears 21 located on both sides of the support 17. The ears 21 defining a recess in which a spring clip 19 is mounted for urging the first ends of brake pads 20 and 30 against the guide surfaces 14 and 15 and prevent "chattering" of the brakes in use.

Referring to FIG. 3, the anchor plate arm 11 is provided with a bore 18 for receiving the end of a shouldered guide pin 22, the shoulder on the pin bearing against the arm 11 and the pin being a force fit in the bore 18. The pin 22 may be in threaded engagement with the anchor arm 11 as shown in the drawing. The pin 22 is provided with a second shouldered portion 23 whereby the lip 25 of a flexible seal 26 can be gripped between that shoulder on the pin and the anchor arm 11. The pin 22 further has an annular groove 24 extending around its periphery intermediate its ends for a purpose to be hereinafter described.

Figure 2:
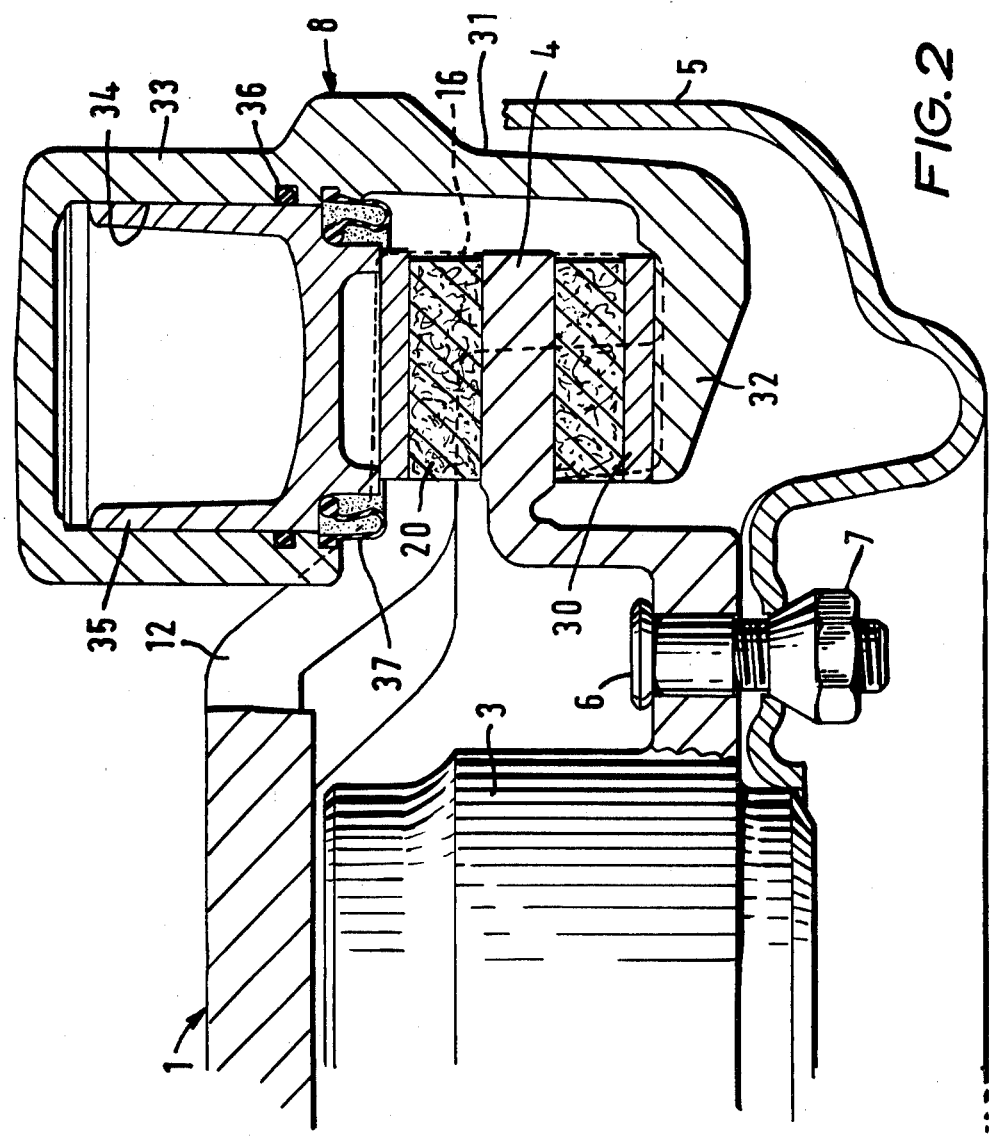
FIG. 2 is a sectional view taken on the line II—II in FIG. 1 in the direction of the arrows.

As shown in FIGS. 1 and 5, the caliper 8 comprises a casting having a central portion 31 which straddles the brake rotor 4 and from one end of which a reaction portion 32 depends for acting on the outboard brake pad assembly 30. As shown in FIG. 2, at the other end of the central portion 31 is a hydraulic cylinder portion 33 having a bore 34 in which a piston 35 is reciprocally mounted. An annular seal 36 seals the clearance between the piston 35 and bore 34 and a flexible boot seal 37 is interposed between the cylinder portion 33 and the piston 35 to protect the bore 34 from contamination. The interior of the cylinder bore 34 is connected by a fluid line to a hydraulic pressure source (not shown). The piston 35 is arranged to engage with the shoe of the inboard brake pad 20.

The caliper 8 is further provided with two arms 38 and 39 extending from the sides of the cylinder portion 33 and terminating in bosses 40 and 50, respectively. The boss 40 is designed to fit over the pin 22 (FIG. 3) and a grub screw 41 passing through a threaded bore in the boss 40 enters the groove 24 in the pin 22. In this manner, axial movement of the boss, and hence the caliper 8, with respect to the anchor plate 1 is limited to the length of the groove 24. A flexible seal 42 is fitted onto the boss 40 to prevent the ingress of dirt which could interfere with the sliding action of the caliper 8 on the pin 22 and the flexible seal 26 serves the same purpose on the other side of the boss 40.

Figure 4:
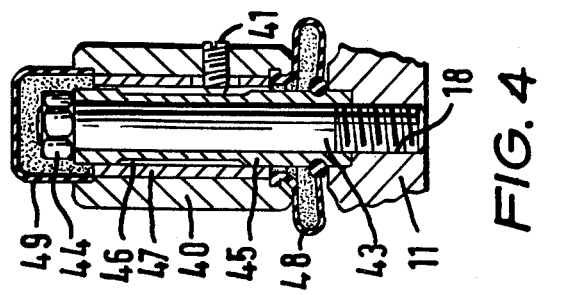
FIG. 4 is a sectional view similar to FIG. 3, showing part of the yoke or anchor plate and a modified form of mounting the caliper on the anchor plate.

In the modified consturction shown in FIG. 4, the bore 18 in the anchor plate arm 11 is screw-threaded to receive the screw-threaded end of a guide pin 43 having a hexagonal head 44 at its other end. A sleeve 45 fitted over the pin 43 is clamped between the head 44 and the anchor arm 11 and is provided with a groove 46 similar to the groove 24. A bearing sleeve 47 is mounted over the sleeve 45 and the boss 40 fits onto the sleeve 47. The sleeves 45 and 47 are slidable with respect to each other, axial movement being limited by the grub screw 41 engaging the ends of the groove 46 in the sleeve 45. A flexible seal 48 is secured to the sleeve and one side of the boss 40 and a seal 49 is fitted to the other side of the boss 40 to prevent the ingress of dirt. This arrangement has the advantage that wear takes place on the sleeves 45 and 47 rather than the boss 40 so that in the event of excessive wear taking place only the sleeves need to be replaced rather than the whole caliper 8 and possibly also the anchor plate 1.

The boss 50 is designed to be secured to the arm 12 of the anchor plate 1 by means of guide pin or bolt 51 as shown in FIG. 6. The anchor plate arm 12 is provided with a screw-threaded bore 58 in which a screw-threaded, stepped, end portion 52 of the bolt 51 can be received. Mounted within the boss 50 are an annular seal 54, a radiused convex sleeve 55 and one end of a flexible boot seal 56. The sleeve 55 is preferably made of a deformable material such as soft plastics. The other end of the seal 56 is engaged in a groove 53 in the bolt 51.

In the modified construction shown in FIG. 7, the bolt 51 is replaced by guide pin or bolt 57 which is not stepped but which is provided instead with a sleeve 58. The arrangement is otherwise the same as in FIG. 6 but this alternative permits the use of a standard bolt.

OPERATION

In use, when hydraulic pressure fluid is introduced into the cylinder bore 34, the piston 35 is forced towards the brake rotor 4 to cause the inboard brake pad 20 to engage the rotor 4. At the same time, the caliper 8 is forced to slide on the pin 22 or 43 and the bolt 51 or 57 in a direction opposite to that of the piston 35. The reaction portion 32 of the caliper forces the outboard brake pad 30 against the other side of the brake rotor 4.

Braking torque or load is transmitted directly from the brake pads 20 and 30 to the anchor plate. The caliper 8 and the guide pins 22 and 51 which connect the caliper 8 to the anchor plate 1 do not carry the braking load.

The guide pins and bolts on the anchor plate arms 11 and 12 extend in a direction away from the brake rotor 4. Since the bosses 40 and 50 for securing the caliper 8 to the anchor plate 1 are provided on arms 38 and 39 which extend from the cylinder portion 33, only the relatively thin central portion 31 of the caliper 8 needs to straddle the brake rotor 4. Thus, the mounting or guide pins for the caliper 8 may be located within the radial dimension of the rotor 4 thereby enabling a larger rotor to be used for a given size of vehicle wheel.

When the brake pads have become worn and are due for replacement, the caliper 8 may be simply pivoted clear of the brake pad assemblies 20 and 30 by removing the bolt 51 or 57 and pivoting the caliper on the pin 22 or 43. To allow this pivoting action to take place, the groove 24 in the pin 22 desirably extends around the circumference of the pin 22 to an extent sufficient for the caliper 8 to be pivoted from the position shown in full lines in FIG. 1 to the position shown in chain-dotted lines. Similarly, the groove 46 in the sleeve 43 should desirably allow the same extent of pivoting of the caliper 8. If the groove 24 or 46 does not allow this pivoting action of the caliper 8, the grub screw 41 must be screwed out of engagement in the groove which not only complicates brake pad replacement but also entails the risk of allowing the boss 40 to slide axially off the pin and thereby damaging the seals and disturbing the alignment of the caliper 8 on the anchor plate 1.

Once the caliper 8 has been pivoted to the position shown in chain-dotted lines in FIG. 1, the brake pad assemblies 20 and 30 can be simply removed by manually pressing them toward the guide support 17 against the the action of the spring clip 19 until the first ends of the pads 20 and 30 are clear of the guide surfaces 14 and 15 where upon the pads can be simply lifted out of engagement with the guide portions 13 and 16. Replacement brake pad assemblies can then be fitted in the same manner and the caliper 8 returned to the position shown in full lines in FIG. 1 by pivoting on the pin 22 or 43. The bolt 51 or 57 is then once again screwed into the bore 58 in the anchor arm 12 to secure the caliper 8 in position.

The sleeve 55 in the boss 50 enables manufacturing tolerances to be taken up for a correct alignment of the caliper 8 on the anchor plate 1. The convex configuration assists in this but if a deformable material is used still greater accuracy in alignment can be achieved.

A foregoing description presents the presently preferred embodiments of this invention. Modifications and alterations may occur to those skilled in the art that will come within the scope and spirit of the following claims.

We claim:

1. A floating caliper disc brake comprising an anchor plate, a caliper, a pair of brake pads, and a brake rotor; said anchor plate having first and second diverging arms with first and second axially extending guide portions, respectively, at the outer ends of said arms;

said guide portions extending across the periphery of said rotor;

said pair of brake pads being supported by said guide portions and disposed adjacent the braking surfaces of said rotor;

each of said pair of brake pads having a first surface in slidable engagement with said first guide portion;

each of said pair of brake pads having a second surface circumferentially spaced from said first surface;

retainer spring means interposed between said second surfaces and said second guide portion;

said caliper having a reaction portion engaging one of said brake pads;

a piston supported in said caliper and engaging the other of said brake pads;

first and second cantilever guide pins rigidly secured to said first and second of said anchor plate diverging arms, respectively, at locations radially inwardly of said first and second guide portions;

said guide pins extending in a direction away from said rotor;

said caliper having first and second support arms extending in opposite circumferential directions;

said first and second support arms of said caliper having bores that slidably engage said first and second guide pins;

said guide pins being disposed within the radial dimension of said rotor;

said first guide pin being readily disengageable from said first diverging arm of said anchor plate and said caliper being constructed to be pivoted about said second guide pin when said first guide pin is disengaged from said first diverging arm, said caliper being pivotally displaceable to a position whereby said pair of brake pads may be readily removed from their engagement with said first and second guide portions for the purpose of repair or replacement;

limit means interposed between said second guide pin and said second support arm of said caliper constructed to limit the axial displacement of said caliper;

said limit means comprising a pair of axially spaced shoulders formed on said second guide pin and a reduced diameter portion formed on said second guide pin between said shoulders;

said limit means further comprising a threaded set screw extending through said second support arm of said caliper in a radial direction with respect to the axis of said second guide pin;

the inner end of said set screw being disposed between said shoulders of said second guide pin and spaced apart from said reduced diameter portion.

* * * * *